Figure 1:
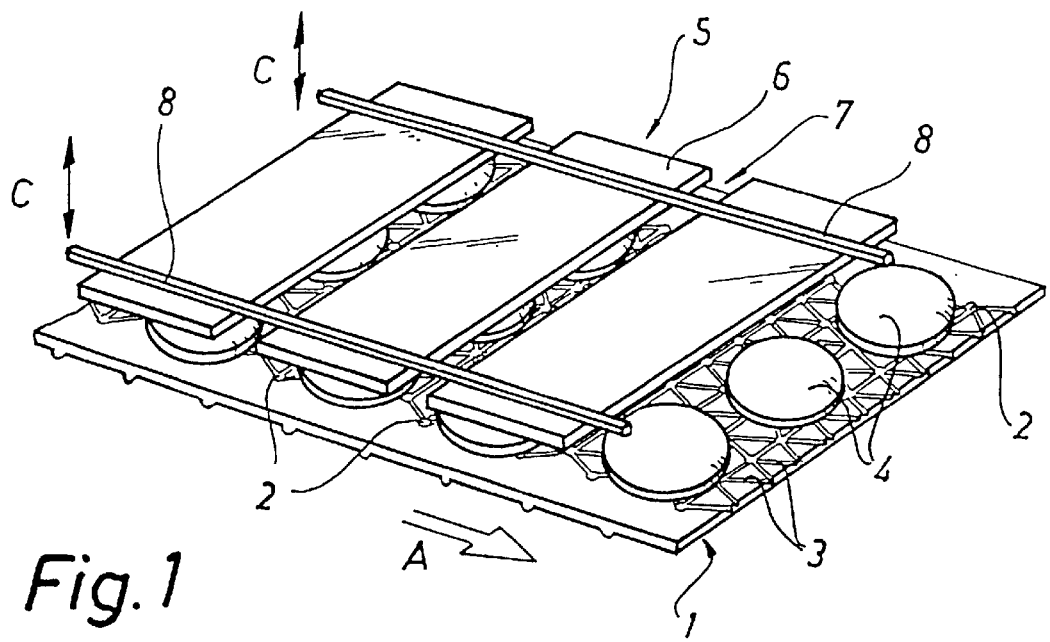

United States Patent
Rothstein

[19]
[11] Patent Number: 5,832,734
[45] Date of Patent: Nov. 10, 1998

[54] METHODS AND DEVICE FOR AIR TREATMENT

[75] Inventor: Sven-Olle Rothstein, Ängelholm, Sweden

[73] Assignee: Frigoscandia Equipment AB, Helsingborg, Sweden

[21] Appl. No.: 930,046

[22] PCT Filed: Apr. 3, 1996

[86] PCT No.: PCT/SE96/00434

§ 371 Date: Sep. 26, 1997

§ 102(e) Date: Sep. 26, 1997

[87] PCT Pub. No.: WO96/31745

PCT Pub. Date: Oct. 10, 1996

[30] Foreign Application Priority Data

Apr. 5, 1995 [SE] Sweden .................................. 9501239

[51] Int. Cl.[6] ............................................................ F25D 13/06
[52] U.S. Cl. ................................................. 62/63; 62/380
[58] Field of Search ................................. 62/63, 341, 380

[56] References Cited

U.S. PATENT DOCUMENTS

| | | | |
|---|---|---|---|
| 1,930,414 | 10/1933 | Buhr | 62/380 |
| 3,115,756 | 12/1963 | Overbye | 62/63 |
| 3,267,585 | 8/1966 | Futer | 62/63 |
| 3,393,532 | 7/1968 | Khoylian | 62/63 |
| 3,881,322 | 5/1975 | Le Diouron | 62/63 |
| 3,886,762 | 6/1975 | Rothstein et al. | 62/380 |
| 5,123,261 | 6/1992 | Cope | 62/380 |
| 5,131,241 | 7/1992 | Battistella | 62/341 |
| 5,247,801 | 9/1993 | Jaxmar et al. | 62/63 |
| 5,265,441 | 11/1993 | Kramer et al. | 62/374 |

FOREIGN PATENT DOCUMENTS

| | | |
|---|---|---|
| 0 452 844 | 10/1991 | European Pat. Off. . |
| WO 93/07429 | 4/1993 | WIPO . |

*Primary Examiner*—Ronald C. Capossela
*Attorney, Agent, or Firm*—Browdy and Neimark

[57] ABSTRACT

A foodstuff air treatment device includes a housing (1) with an elongated trough (11) for receiving the foodstuffs to be treated. The trough extends through the housing and includes a foraminated bottom (15), a first side wall (17), and a second side wall (15). A heat exchanger (12) is disposed in the housing, and a fan assembly (13) is also disposed within the housing for producing an air flow that circulates through the heat exchanger, up through the trough, and back to the heat exchanger. One side wall (17) of the trough is adjustable, laterally to the length of the trough, for changing the width of the trough.

7 Claims, 1 Drawing Sheet

METHODS AND DEVICE FOR AIR TREATMENT

The present invention generally relates to a method and a device for the air treatment of products conveyed on a foraminated conveyor belt. Such air treatment may, for instance, involve cooling, heating or drying of the products. To be more specific, the invention concerns a method and a device in which air is blown upwards towards the underside of the conveyor belt, the latter being adapted to convey the products through a housing in which the air treatment proper is carried out.

One object of this invention is to improve the efficiency of the method and the device mentioned above.

Another object of the invention is to enable such an improvement of existing devices, for instance a device of the type described in U.S. Pat. No. 5,415,013.

In accordance with the invention, these objects are attained by a method and a device exhibiting the distinctive features recited in the appended independent claims. Preferred embodiments of the invention exhibit the distinctive features recited in the appended dependent claims.

Since the air blown upwards through the conveyor belt and between the products is, transitionally and at a distance above the conveyor belt, diverted in directions essentially contained in the plane of the conveyor belt owing to the provision of slit-shaped openings extending transversely of the longitudinal direction of the conveyor belt, air flows will be generated along the upper side of the products, which has the aimed-at effect of expediting the air treatment as a result of the treatment air coming into better contact with the upper side of the products.

In order to optimise the inventive effect, the air flows generated along the upper side of the products have to sweep past this side as closely as possible without the flow resistance becoming too considerable. This can be achieved by the provision of air-diverting means which can be vertically adjusted above the conveyor belt according to the thickness of the product at issue.

In order to render the air treatment even more effective, the upper side of the conveyor belt may be formed with grooves for diverting along the underside of the products the air blown upwards towards said underside. The conveyor belt may then be formed with throughholes, said-grooves connecting each such hole with every adjacent hole.

Figure 2:
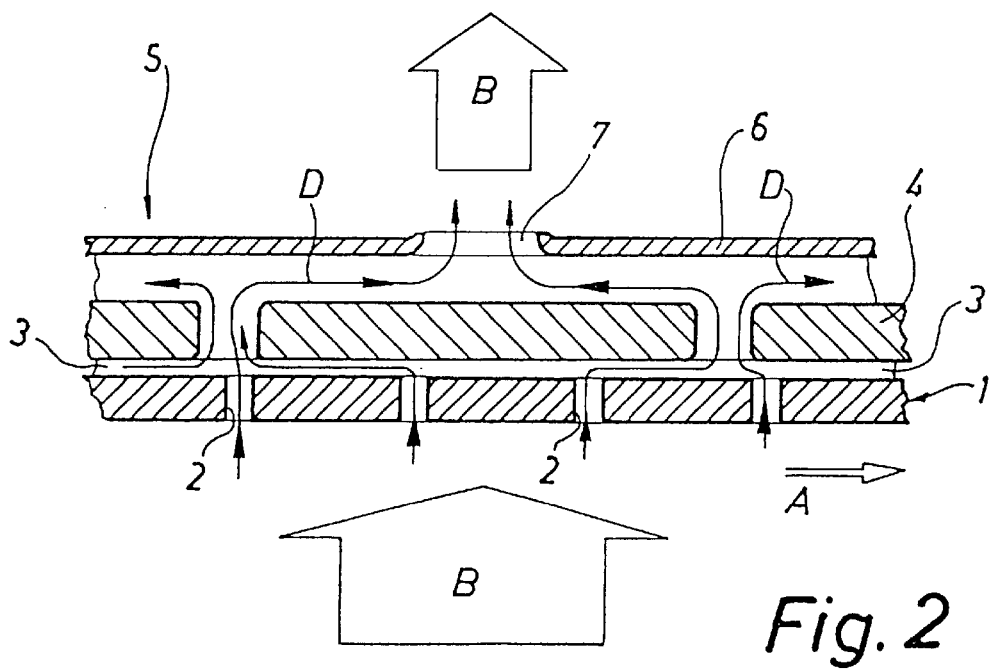

The invention will now be described in more detail with reference to the accompanying drawings, in which FIG. 1 is a schematic perspective view, and FIG. 2 is a longitudinal section of an embodiment of the conveyor belt and the air-diverting means according to the invention.

To be more specific, the Figures illustrate a conveyor belt 1, which is foraminated and thus presents a plurality of throughholes 2. On its upper side, the conveyor belt 1 is further formed with grooves 3, which connect each hole 2 with every adjacent hole 2. The conveyor belt 1 may advantageously be of the general type described in SE 9200448-0.

The conveyor belt 1 is intended to convey products 4, such as hamburger patties, in a direction A through a housing (not shown), in which air is blown towards the underside of the conveyor belt 1, as indicated by an arrow B in FIG. 2.

The air thus blown upwards towards the underside of the conveyor belt 1 will pass through the conveyor belt 1, not only through the holes 2 not covered by the products 4 but also through the holes 2 covered by the products 4 via the channels formed by the grooves 3 and the subjacent products 4 and opening into the area outside each product 4.

According to the invention, an air-diverting means 5 in the form of a grating is stationarily arranged at a distance above the conveyor belt 1 in a plane essentially parallel to the plane of the belt. More specifically, the illustrated grating 5 consists of crossbars 6 extending transversely of the longitudinal direction of the conveyor belt 1 and being spaced apart in this direction, such that the grating 5 is formed with slit-shaped openings 7 extending transversely of the longitudinal direction of the conveyor belt 1. The crossbars 6 are supported by a frame 8 (only schematically indicated), which is vertically adjustable in the direction indicated by arrows C in FIG. 1, enabling an adjustment of the distance between the grating 5 and the upper side of the conveyor belt 1 according to the thickness of the products 4 to be treated.

Conveniently, the width of the slits 7 in relation to the width of the crossbars 6 may be so chosen that the open area of the grating 5 in relation to the total area thereof corresponds to the open area of the conveyor belt 1 with the products 4 in relation to the total area thereof. The air resistance of the grating 5 should suitably be somewhat lower than that of the conveyor belt 1 with the products 4 thereon.

Owing to the device according to the invention, the air passing through the conveyor belt 1 between the products 4 in the direction indicated by the arrows B will be diverted in directions parallel to the plane of the conveyor belt 1, as indicated by arrows D in FIG. 2. This diversion of the air flow is but transitional, and the air flows along the upper side of the products 4 will revert to the direction indicated by the arrows B when having passed through the slits 7 formed between the crossbars 6. As a result of the movement of the conveyor belt 1 in the direction indicated by the arrow A, the air flows in the direction indicated by the arrows D will continuously be altered with respect to extent and direction.

It goes without saying that a great many modifications of the above embodiment of the device according to the invention are obvious to those skilled in the art. Thus, the grating 5 may, for instance, have a completely different ratio of air-diverting surfaces to air-permeable slits or other similar openings. Transverse slits do, however, have the advantage that essentially the entire upper side of the products will receive the same treatment.

I claim:

1. A method for air treatment of products conveyed on a foraminous conveyor belt, comprising:

providing a plurality of slit-shaped openings located at a distance above the conveyor belt, the slit-shaped openings extending transversely to a longitudinal direction of the conveyor belt; and blowing air upward through the conveyor belt; whereby the air is diverted to pass over the products and through the slit-shaped openings.

2. The method according to claim 1, comprising a step of adjusting the distance in proportion to a thickness of the products.

3. A device for air treatment of products (4) by blown air in a housing, the device comprising:

a foraminous conveyor belt (1) pervious to the blown air and located within the housing;

an air diverter (5) disposed within the housing, the air diverter including a plurality of slit-shaped openings located at a distance above the conveyor belt, the slit-shaped openings extending transversely to a longitudinal direction of the conveyor belt; and whereby the air is diverted to pass over the products and through the slit-shaped openings.

4. The device according to claim 3, comprising a device adjusting the distance.

5. The device according to claim 3, wherein the slit-shaped openings include a total area which is substantially equal to or greater than a total air-permeable area of the conveyor belt thereunder.

6. The device according to claim 3, wherein an upper side of the conveyor belt comprises grooves (3) diverting the air along an underside of the products.

7. The device according to claim 6, wherein the conveyor belt comprises throughholes (2) and the grooves connect adjacent pairs of the throughholes.

* * * * *